Jan. 23, 1968

P. LAGANA 3,364,843

COFFEE PERCOLATOR

Filed Feb. 21, 1966

INVENTOR.
PHILIP LAGANA

BY

*Roberts & Cohen*

ATTORNEYS

United States Patent Office 3,364,843
Patented Jan. 23, 1968

3,364,843
COFFEE PERCOLATOR
Philip Lagana, Bayside, N.Y., assignor to
Dominic Lagana, Dumont, N.J.
Filed Feb. 21, 1966, Ser. No. 528,914
10 Claims. (Cl. 99—312)

ABSTRACT OF THE DISCLOSURE

Coffee percolator having a base section with a handle and a deep detachable lid on the base section and provided with a spout, there being a central tube supporting a coffee grounds holder, the tube extending to a sight glass provided in the lid.

---

This invention relates to coffee makers and more particularly to improvements in coffee percolators.

While acknowledging that coffee percolators have been known for many years and that there are a wide variety of constructions which have been developed, I have discovered various problems which have not yet been solved and various areas in which improvement is possible. It is an object of my invention to provide a solution to some of these problems and to provide a generally improved percolator construction having numerous benefits as will appear hereinafter.

More specifically, one object of my invention is to provide a coffee percolator embodying features which avoid overflow during operation. At the same time, my invention advantageously provides a construction which is economically producible and which is adapted to mass production techniques.

Further, my improved percolator incorporates a spout in such a manner that it is readily accessible for cleaning and so forth. Moreover, said spout can be conveniently adjusted to any desired orientation in respect of an associated handle thereby adapting the percolator to a greatly facilitated use by right or left-handed users. In addition, my improved percolator provides for improving the path of water flow during the circulation of the same.

In achieving the above objectives, I have employed numerous related features. For example, I employ a coffee grounds holder of which has a cover which is held on in a very unusual and useful manner. Moreover, the holder is preferably of a novel form which facilitates the dispensing of coffee.

By way of brief description, a coffee percolator constructed in accordance with my invention comprises a base section in the form of a receptacle adapted to contain water which is to be converted to coffee, with a handle being conventionally provided on the base section. Also included in the construction is a detachable lid which is superposed on the base section to form a chamber with the same. Tubular means will be provided in the chamber to convey heated water from the base section to the lid and a perforated coffee grounds holder will be provided in the chamber to intercept heated water returning from the lid to the base section. A spout is provided for the percolator for the dispensing of coffee prepared therein. This spout is significantly located on the detachable lid for the discharge of coffee which has been prepared.

The height of the lid is such as to form a chamber such as to avoid the boiling over of the water during the heating and processing of the same. Moreover, the chamber in the lid provides for an improved diffusion of water and thus an improved brewing of the resulting coffee.

Because the spout is located on the lid, this portion of the construction can be readily removed for cleaning and maintenance. Moreover, it is thus provided in such a manner as to lend itself to mass production techniques and economical manufacture.

Advantageously, the location of the spout on the detachable lid results in that the spout can be readily adjusted relevant to the base section and to the handle thereon. Accordingly, the spout can be oriented for special uses and for particularly advantageous location in respect of right and left-handed users.

The above and other objects, features and advantages of the invention will be better understood from the following detailed description of a preferred embodiment of the invention as illustrated in the accompanying drawing, in which.

Figure 1:
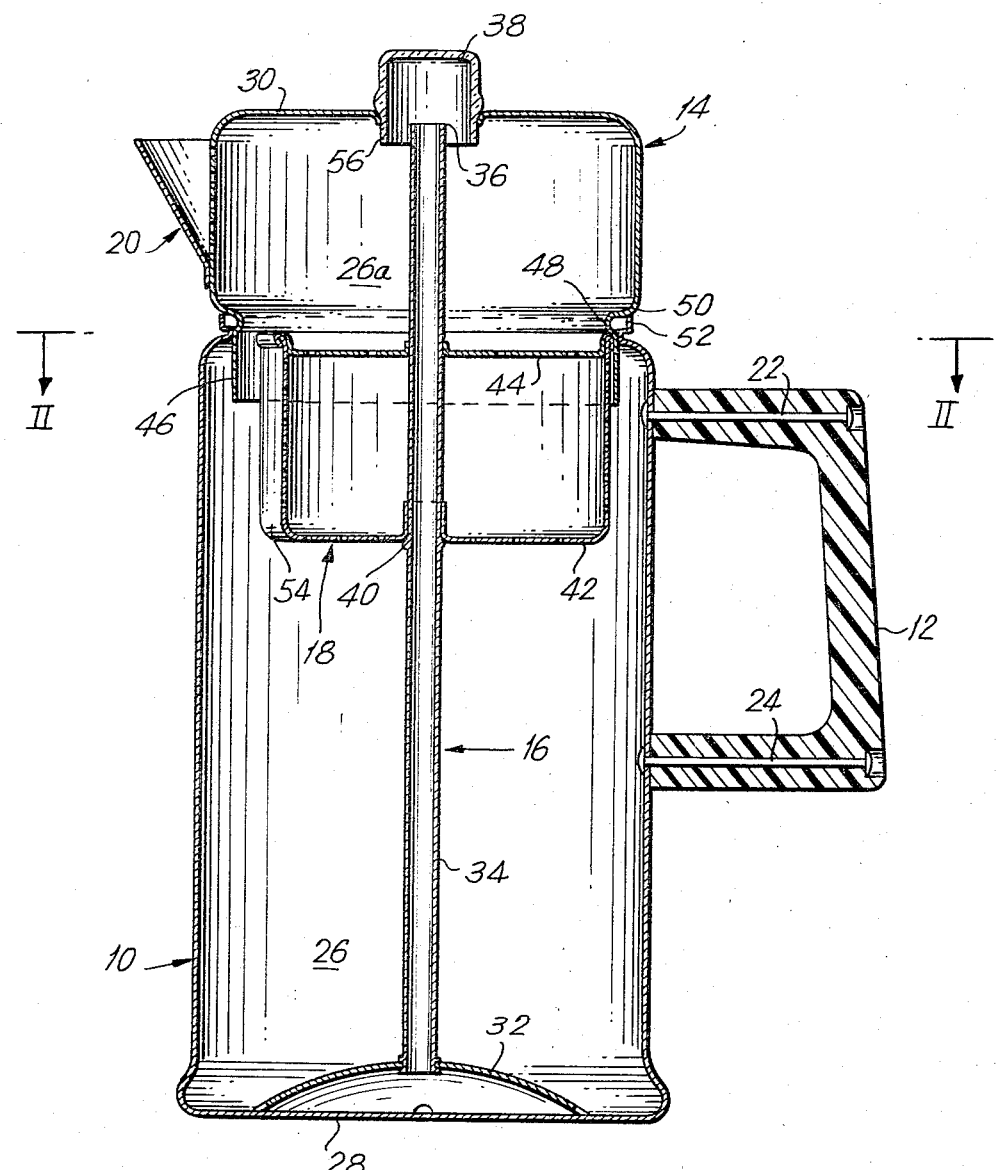
FIGURE 1 is a vertical and cross-sectional view taken through a percolator provided in accordance with the invention (see cross-sectional lines I—I of FIGS. 2 and 3)
Figure 2:
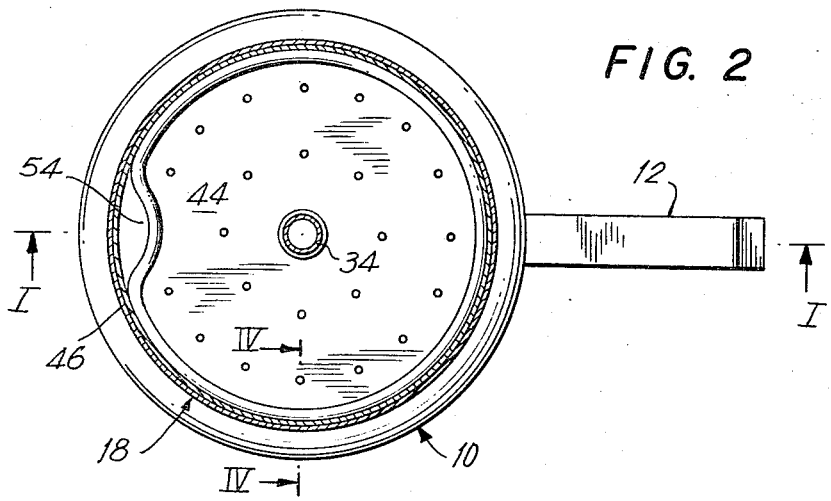
FIGURE 2 is a horizontal cross-sectional view of the percolator taken along line II—II of FIG. 1.

The invention is not principally concerned with the materials from which the various elements of the disclosed percolator is constructed and it may be assumed hereinafter that conventional materials are employed such as, for example, aluminum for the metal parts and plastic for the handle and suitable glass and/or other materials wherever required. Moreover, the invention is not concerned with the method by which heat is applied to the water which is to be processed, so that it will be assumed that such heat can be supplied electrically through the use of electrical elements or by an externally supplied gas flame or the like.

More particularly, the percolator illustrated in the drawing comprises a base section 10, a handle 12, a detachable lid 14, a tubular means 16, a perforated coffee grounds holder 18 and a spout 20.

The base section 10 is in the form of a receptacle adapted to contain water which is to be converted to coffee. The handle 12 which is preferably of a material which does not conduct heat is mounted on the base section 10 by means of bolts 22 and 24 or by any other suitable means which can accomplish the purpose of providing for suitable manipulation of the percolator.

The detachable lid 14 is superposed on the base section 10 to form a chamber 26 extending from the bottom 28 of the base section 10 to the top 30 of the lid 14.

The tubular means 16 is supported in the chamber 26. Said tubular means comprises a stand or pedestal 32 atop which is mounted a vertically disposed tube 34 extending substantially throughout the entire height of the chamber 26. Tube 34 has an upper extremity 36 located closely adjacent top 30 of detachable lid 14 and in detachable lid 14 is mounted a sight glass 38 through which water or coffee erupting through the top of the tube 34 may be inspected.

Fluid spilling out from the top of tube 34 will enter subchamber 26a which is the top portion of the overall chamber 26 and lies within the lid 14. The perforated holder 18 will intercept the heated water or coffee returning to the bottom of chamber 26 under the influence of gravity. In well known manner, the provision of coffee grounds in the holder 18 will provide for the flavoring of the heated water in increasing concentration with coffee materials so that ultimately a coffee is brewed in the chamber 26 to the satisfaction of the user.

The lid 14 and base section 10 are preferably cylindrical members of substantially equal diameter, although other shape and size relationships may be employed. The perforated holder 18 is also a cylindrical member which preferably encircles the tube 34 and seats thereon on a protuberance 40 provided on said tube. The perforated holder 18 is preferably situated wholly within the base section 10 and substantially obturates the upper opening in the latter.

Said holder 18 consists of a coffee grounds container 42 having a cover 44 detachably seated thereon. Both the container and the cover are usually perforated to permit the flow of fluids therethrough.

The lid 14 depends partially into the base section 10 in the form of a skirt 46 which encircles the perforated holder 18. Immediately above the skirt 46 the lid 14 is provided with a first shoulder 48 adjacent to which is a second shoulder 50. Base section 10 extends upwardly in the form of an annular rim 52, the shoulder 50 of lid 14 seating on such rim.

With the shoulder 50 seated on the rim 52, the shoulder 48 is spaced from protuberance 40 on tube 34 by a distance which corresponds to the height of the perforated holder 18 so that shoulder 48 locks cover 44 to the container 42. In this manner a convenient assembly of the components of holder 18 is provided when the lid 14 is seated on base section 10.

As a further feature of the invention, the holder 18 is provided with a vertically oriented peripheral groove 54 and when the percolator is tilted from vertical attitude to a more horizontal attitude groove 54 provides a passage through which fluid can flow from the bottom of chamber 26 into upper chamber portion 26a.

A most important feature of the invention concerns the disposition of spout 20 and the location and orientation of lid 14 and chamber 26a. In a preferred embodiment of the invention, the lid 14 is preferably of approximately the same height as the grounds holder 18. This, however, can vary within fairly wide ranges while still coming within the scope of the invention. Thus it may be specified that the lid preferably has a height from about one-fifth to one-half of the height of the base section and which further is a minimum of about one inch. The spout 20, which is generally a vertically oriented member of a height which is somewhat less and therefore exceeded by the height of the lid 14.

As a result of the aforedescribed construction, water erupting from tube 34 will be virtually unable to overflow the percolator container in contrast to those constructions wherein the spout would be located in the vicinity of the holder 18 at the outer and upper portion of the base section 10. Moreover, the provision of chamber 26a enables a dispersion of fluids flowing out of the top 36 of tube 34 so that the same can be thoroughly distributed over the cover 44 and can flow through all of the grounds within the container in improved manner.

Figure 3:
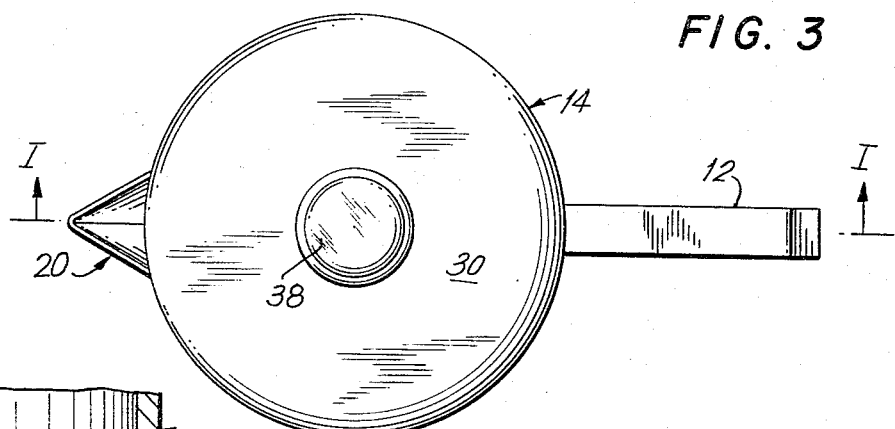
FIGURE 3 is a top view of the percolator illustrated in FIGS. 1 and 2.
Figure 4:
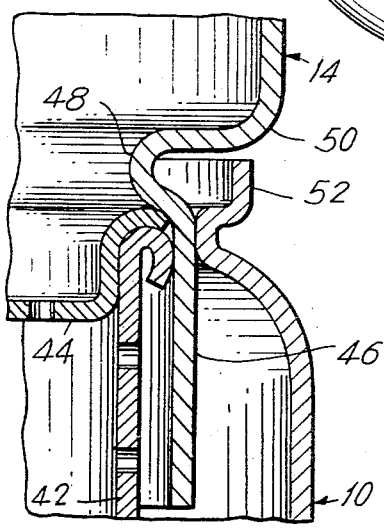
FIGURE 4 is a cross-sectional view take along the line IV—IV of FIG. 2.

Advantageously, shoulder 50 of lid 14 and rim 52 of base section 10 constitute mutually engaged portions enabling relative rotation between the lid 14 and base section 10 so that the position of spout 20 can be adjusted relative to the handle. Thus, for example, the spout may be linearly aligned or diametrally aligned with handle 12 as shown in FIG. 3 or alternatively spout 20 can be located in one direction or the other to accommodate special conditions of use of the percolator or to render the percolator more convenient to right-handed or left-handed persons.

As a further feature of the invention within the lid 14 the sight glass 38 may be provided with a depending skirt portion 56 encircling the top 36 of tube 34 and therefore guiding the downward movement of fluid erupting upwardly out of tube 34.

From the above it will be seen that the various features of the invention are interrelated so that the provision of one constructional advantage results in other related advantages inuring to the benefit of the invention as a whole. Thus, for example, the provision of the spout 20 on the lid 14 not only insures against flowing over of the fluid being processed, but at the same time positions the spout in such a manner that the same may be easily cleaned and readily installed during manufacture. At the same time, it will be noted that the mounting of spout 20 on lid 14 renders the location of the spout adjustable in the manner which has been indicated hereinabove.

There will now be obvious to those skilled in the art many modifications and variations of the construction set forth above. These modifications and variations will not depart from the scope of the invention if defined by the following claims.

What is claimed is:

1. A coffee percolator comprising a base section in the form of a receptacle adapted to contain water which is to be converted to coffee, a handle on said base section, a detachable lid superposed on said base section to form a chamber with the same, tubular means in the chamber to convey heated water from the base section to said lid, a perforated coffee grounds holder in said chamber to intercept heated water returning from the lid to the base section, and a spout on said detachable lid for dispersing the thusly prepared coffee, said tubular means including a stand seated in said base section and a vertical tube on said stand and extending upwardly through said chamber to a position adjacent the top of said lid, said lid including a sight glass juxtaposed to said position.

2. A percolator as claimed in 1, wherein the perforated holder is positioned fully within said base section.

3. A percolator as claimed in claim 1, wherein said spout is a vertically disposed member of a height which is exceeded by that of said lid.

4. A percolator as claimed in claim 1, wherein said base section and lid have mutually engaged portions enabling relative rotation between said lid and base section so that the position of the spout can be adjusted relative to said handle.

5. A percolator as claimed in claim 1, wherein the perforated holder encircles said tube and the tube has a protuberance which suspends the holder above the bottom of the base section, the base section having an upper opening which is substantially obturated by said holder.

6. A percolator as claimed in claim 5, wherein the holder has a vertically oriented peripheral groove which facilitates the discharge of coffee from the base section into said lid and thus to said spout.

7. A percolator as claimed in claim 5, wherein the lid extends partly in the form of an annular skirt into the base section, said holder being positioned at least partly within the skirt and including a perforated grounds container and a detachable perforated cover seated on the container, said lid including a shoulder adjacent the skirt to hold the cover on said container.

8. A percolator as claimed in claim 7, wherein the base section includes an upwardly extending annular rim, said lid including a second shoulder seated on said rim.

9. A percolator as claimed in claim 8, wherein the height of the perforated holder corresponds to the distance between the protuberance on the tube and the first said shoulder on the lid with the latter seated on said rim.

10. A percolator as claimed in claim 9, wherein the perforated holder and the lid are of generally the same height.

References Cited

UNITED STATES PATENTS

| | | | |
|---|---|---|---|
| 1,831,384 | 11/1931 | Grometstein | 99—310 |
| 1,887,354 | 11/1932 | Kapner | 99—311 |
| 2,557,317 | 6/1951 | Serio | 99—310 |
| 2,685,248 | 8/1954 | Ohlsson | 99—313 |
| 2,866,400 | 12/1958 | Cornelison | 99—314 |
| 2,899,887 | 8/1959 | Berry et al. | 99—310 |

ROBERT W. JENKINS, *Primary Examiner.*